Dec. 13, 1927.
V. BENDIX
WHEEL
Filed Oct. 8, 1927
1,652,752
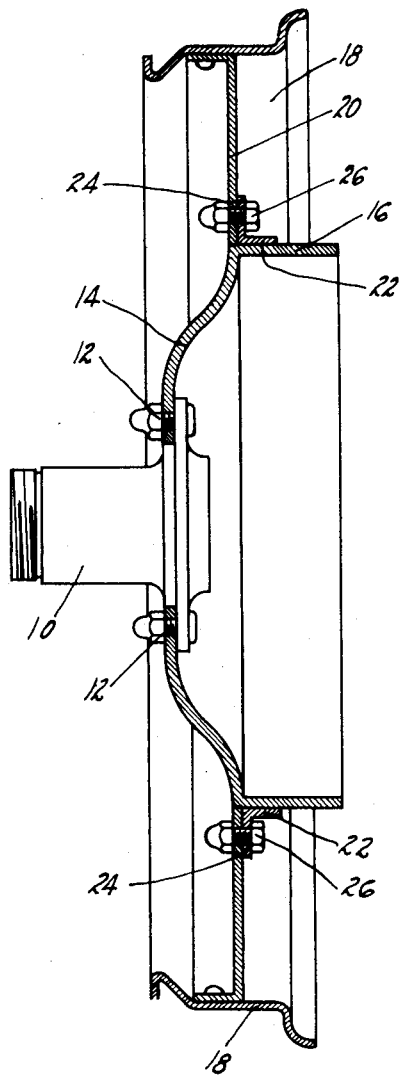
INVENTOR
VINCENT BENDIX
BY
ATTORNEY Patented Dec. 13, 1927.

1,652,752

UNITED STATES PATENT OFFICE.

VINCENT BENDIX, OF CHICAGO, ILLINOIS, ASSIGNOR TO MOTOR INDUSTRIES, INC., OF CHICAGO, ILLINOIS, A CORPORATION OF ILLINOIS.

WHEEL.

Application filed October 8, 1927. Serial No. 224,792.

This invention relates to wheels and is illustrated as embodied in a novel steel disk wheel for an automobile. An object of the invention is to provide a simplified construction of wheel in which the major part of the load-carrying disk is formed by a brake drum.

Preferably a reinforcing ring is welded or otherwise secured in position encircling the brake drum, with an annular wheel disk secured to the ring, as for example by bolts securing the annular disk to a flange formed on the ring, thus serving to constitute the annnular wheel disk as the demountable part of the wheel. I prefer to arrange the ring encircling the drum just inside the head of the drum so that it cooperates with the drum to define a shoulder or rabbet just the width of the wheel disk. Thus the wheel disk rests at its inner edge on the braking flange of the drum with the side against the ring which encircles the drum.

The above and other objects and features of the invention, including various novel and desirable details of construction, will be apparent from the following description of one illustrative embodiment shown in the accompanying drawing, in which:

The figure is a vertical central section through one form of wheel embodying my invention.

In the illustrated embodiment the hub 10 of the wheel, which may be of any desired form, is secured by bolts 12 or other fastenings to the head 14 of a brake drum having a cylindrical braking flange 16 within which the brake is arranged when the wheel is in use. The rim 18 of the wheel, which is intended to carry the usual inflatable rubber tire, is riveted or otherwise secured to an annular wheel disk 20 secured in a novel manner to the brake drum which thus forms the central part of the wheel.

Preferably a ring 22 is welded or otherwise secured in position encircling and reinforcing the braking flange 16 of the brake drum. I consider it desirable that the annular wheel disk 20 should rest at its inner edge on the exterior of the braking flange 16, and prefer to form an attaching flange 24 on the ring 22 which engages the rear face of the wheel disk 20. Bolts 26 or other suitable fastenings may be arranged to pass through the attaching disk 24 and through the wheel disk 20, thus demountably securing the wheel disk 20 to the brake drum.

In order to improve the appearance of the wheel as seen from its outer side, I prefer to set the ring 22 inwardly from the head 14 of the brake drum by a distance substantially equal to the thickness of the wheel disk 20, thus forming a shoulder or rabbet just the width of the wheel disk and into which the wheel disk fits, so that the outer face of the wheel presents a smoothly curving and substantially unbroken surface.

While one illustrative embodiment has been described in detail, it is not my intention to limit the scope of the invention to that particular embodiment or otherwise than by the terms of the appended claims.

I claim:

1. A wheel comprising, in combination, a brake drum, a ring encircling the drum and secured to the drum, and an annular wheel disk also encircling the drum and secured to said ring.

2. A wheel comprising, in combination, a brake drum, a ring encircling the brake drum and formed with an outwardly extending flange and which ring is secured to the brake drum, and an annular wheel disk having one face resting against said flange and which is secured to said flange.

3. A wheel comprising, in combination, a brake drum having a substantially cylindrical braking flange which is provided with an outwardly extending part, and a wheel disk of annular form having its inner edge resting directly on the exterior of said braking flange and which is secured to said part.

4. A wheel comprising, in combination, a brake drum having a head and a substantially cylindrical braking flange extending generally perpendicular to said head, a ring encircling said braking flange and placed inwardly from the head to define a shoulder, and an annular wheel disk fitting on said shoulder and secured to said ring.

5. A wheel comprising, in combination, a brake drum having a head and a substantially cylindrical braking flange extending generally perpendicular to said head, a ring encircling said braking flange and placed inwardly from the head to define a shoulder, and an annular wheel disk fitting on said shoulder and secured to said ring, said shoulder being of a width substantially equal to the thickness of the annular wheel disk.

6. A wheel comprising, in combination, a brake drum having a head and a braking flange generally perpendicular to the head and having a member projecting from the outer surface of said flange and with said flange defining a shoulder, and an annular wheel disk fitting in said shoulder and secured to said member.

7. A wheel comprising, in combination, a brake drum having a head and a braking flange generally perpendicular to the head and having a member projecting from the outer surface of said flange and with said flange defining a shoulder, and an annular wheel disk fitting in said shoulder and secured to said member and which is substantially flush on its outer surface with the outer surface of the head of the brake drum.

8. A wheel comprising in combination, a brake drum having a head and a braking flange generally perpendicular to the head and having a member projecting from the outer surface of said flange and with said flange defining a shoulder, and an annular wheel disk fitting in said shoulder and secured to said member, said shoulder being of a width substantially equal to the thickness of the annular wheel disk.

In testimony whereof, I have hereunto signed my name.

VINCENT BENDIX.